(12) United States Patent
Lee

(10) Patent No.: US 7,086,434 B2
(45) Date of Patent: Aug. 8, 2006

(54) DOCKING FRAME FOR POWER SAW MACHINE

(76) Inventor: Wy Peron Lee, 11614 Sterling Ave., Suite 103, Riverside, CA (US) 92503

( * ) Notice: Subject to any disclaimer, the term of this patent is extended or adjusted under 35 U.S.C. 154(b) by 11 days.

(21) Appl. No.: 10/727,314

(22) Filed: Dec. 4, 2003

(65) Prior Publication Data

US 2005/0120849 A1 Jun. 9, 2005

(51) Int. Cl.
*B25H 1/00* (2006.01)

(52) U.S. Cl. .............................. 144/286.1; 144/286.5; 144/287; 83/859; 248/129; 280/47.18

(58) Field of Classification Search ............ 144/286.1, 144/286.5, 287; 83/859, 471.2, 471.3, 472, 83/477, 477.1, 581; 280/47.18, 47.28; 248/166, 248/167, 220.21–225.21, 129

See application file for complete search history.

(56) References Cited

U.S. PATENT DOCUMENTS

| 3,669,031 | A | * | 6/1972 | Cole | ........................... 108/102 |
| 3,931,751 | A | * | 1/1976 | Simonson | ..................... 83/859 |
| 4,239,195 | A | * | 12/1980 | Oltman et al. | ........... 144/286.1 |
| 4,874,025 | A | * | 10/1989 | Cleveland | ................... 144/287 |
| 5,676,124 | A | * | 10/1997 | Lee | .......................... 125/13.01 |
| 5,778,953 | A | * | 7/1998 | Braddock | ................ 144/286.1 |
| 6,273,081 | B1 | * | 8/2001 | Gorgol et al. | ........... 125/13.01 |
| 6,672,348 | B1 | * | 1/2004 | Ransom et al. | ............. 144/287 |

* cited by examiner

*Primary Examiner*—Stephen Choi
(74) *Attorney, Agent, or Firm*—Raymond Y. Chan; David & Raymond Patent Group

(57) ABSTRACT

A docking frame for a cutting machine includes a docking frame including a docking station having a docking socket for receiving a bottom portion of the cutting machine therein, a locker device provided at the docking station for detachably locking the cutting machine at the docking socket, and a peripheral functional gear provided at the docking station as a supplemental implement for the cutting machine so as to enhance a workability thereof.

6 Claims, 5 Drawing Sheets

DOCKING FRAME FOR POWER SAW MACHINE

BACKGROUND OF THE PRESENT INVENTION

1. Field of Invention

The present invention relates to a cutting machine, such as a power saw machines, and more particularly to a docking frame for a power saw machine which is capable of enhancing the flexibility and mobility of the power saw machine.

2. Description of Related Arts

A conventional cutting machine, such as a power saw machine, usually comprises a utility table for supporting a work piece thereon, a cutting head which is overhangingly supported above the utility table, and has a cutting blade rotatably supported thereon, and a motor electrically connected with the cutting head for driving the cutting blade to rotate to cut a the work piece when it is rested on the utility table.

Despite its popularity among industrialists, such a conventional machine obviously suffers from several discrepancies. First, the above-mentioned saw machine has to rely on some forms of base support in order to function. Some large-scale saw machines have their own supporting base incorporating thereto so as to become a self-containing unit as a work station. However, the incorporation between the saw machine and the corresponding supporting base is often highly complicated so that once they are incorporated, it is time-consuming and very inconvenient to separate them for, say, transportation or maintenance purposes.

Moreover, during the course of machining, an operator of the machine may need some more tools to accomplish his intended goal. As a result, he may place those tools in the vicinity of the cutting machine usually, on the ground or on a separate table, and take and use them whenever necessary. However, it is highly inconvenient that the operator, during operating the machine, goes aside and takes the tools and when finished, goes again to put the tools back to the original position. In some situations, especially for complicated machining operations, the operator may not be able to leave the machine even for a short while, if by so doing the quality of the cutting process may be severely deteriorated. The fact that the conventional cutting machine does not usually have a tools box incorporated thereon put the operator into a very difficult position.

For some smaller scale saw machines, they are usually mounted on a supporting table. This causes significant inconvenience to the operator of the machine in that the saw machine itself may lack the auxiliary equipment which is necessary to the machining process. For example, when a large quantity of lubricating oil is required for the machining process, the operator may find that no storing tray exists and that the lubricating oil spoils all over the utility table and even on the ground.

By and large, conventional sawing machines tend to be inflexible. This inflexibility is partly due to the inherent bulky structure of the saw machine itself. However, there do not exist an effective invention to tackle these 'conventional problems' and as a result, such an invention is definitely needed.

SUMMARY OF THE PRESENT INVENTION

A main object of the present invention is to provide a docking frame for a cutting machine, wherein the docking frame is capable of providing an optimal auxiliary support for the operation and the transportation of the cutting machine, thus effectively compensating the inherent flexibility of the conventional cutting machines.

Another object of the present invention is to provide a docking frame for a cutting machine, wherein the docking frame is incorporated with the cutting machine and comprises a peripheral functional gear for providing supplemental implement to the user during the course of machining process of the cutting machine, without needing the user to leave his/her working position. In other words, the peripheral functional gear is readily available for use by the user while he/she is machining.

Another object of the present invention is to provide a docking frame for a cutting machine, wherein the docking frame comprises a dolly frame for facilitating easy transportation of the whole cutting machine, i.e. without needing to disassemble the cutting machine for transportation.

Another object of the present invention is to provide a docking frame for a cutting machine, wherein the docking frame comprises a foldable leg frame mounted to the docking station to form a table frame for supporting the cutting machine thereon.

Another object of the present invention is to provide a docking frame for a cutting machine, wherein the docking frame comprises a locker device which is capable of incorporating the docking frame with a wide variety of cutting machines.

Another object of the present invention is to provide a docking frame for a cutting machine, wherein the docking frame does not involve any complicated and expensive mechanical components and manufacturing processes so that the manufacturing cost and the ultimate selling price of the present invention can be minimized.

Another object of the present invention is to provide a docking frame for a cutting machine, wherein the cutting machine is capable of being easily incorporated into the cutting machine such that the user, such as a consumer product manufacturer, can be able to assemble the docking frame to the cutting machine only by means of some conventional workshop equipments and processes.

Accordingly, in order to accomplish the above objects, the present invention provides a docking frame for a cutting machine which comprises a main frame, a cutting table slidably supported on the main frame, a cutting head having a cutting blade overhangingly supported above the cutting table, and a power device electrically connected to the cutting head to drive the cutting blade to rotate.

The docking frame comprises:

a docking station comprising a boundary frame having a docking socket for receiving a bottom portion of the main frame of the cutting machine;

a locker device provided at the boundary frame for detachably locking the main frame of the cutting machine at the boundary frame; and a peripheral functional gear provided at the docking station as a supplemental implement for the cutting machine to enhance the workability of the cutting machine.

These and other objectives, features, and advantages of the present invention will become apparent from the following detailed description, the accompanying drawings, and the appended claims.

DETAILED DESCRIPTION OF THE PREFERRED EMBODIMENT

Figure 1:
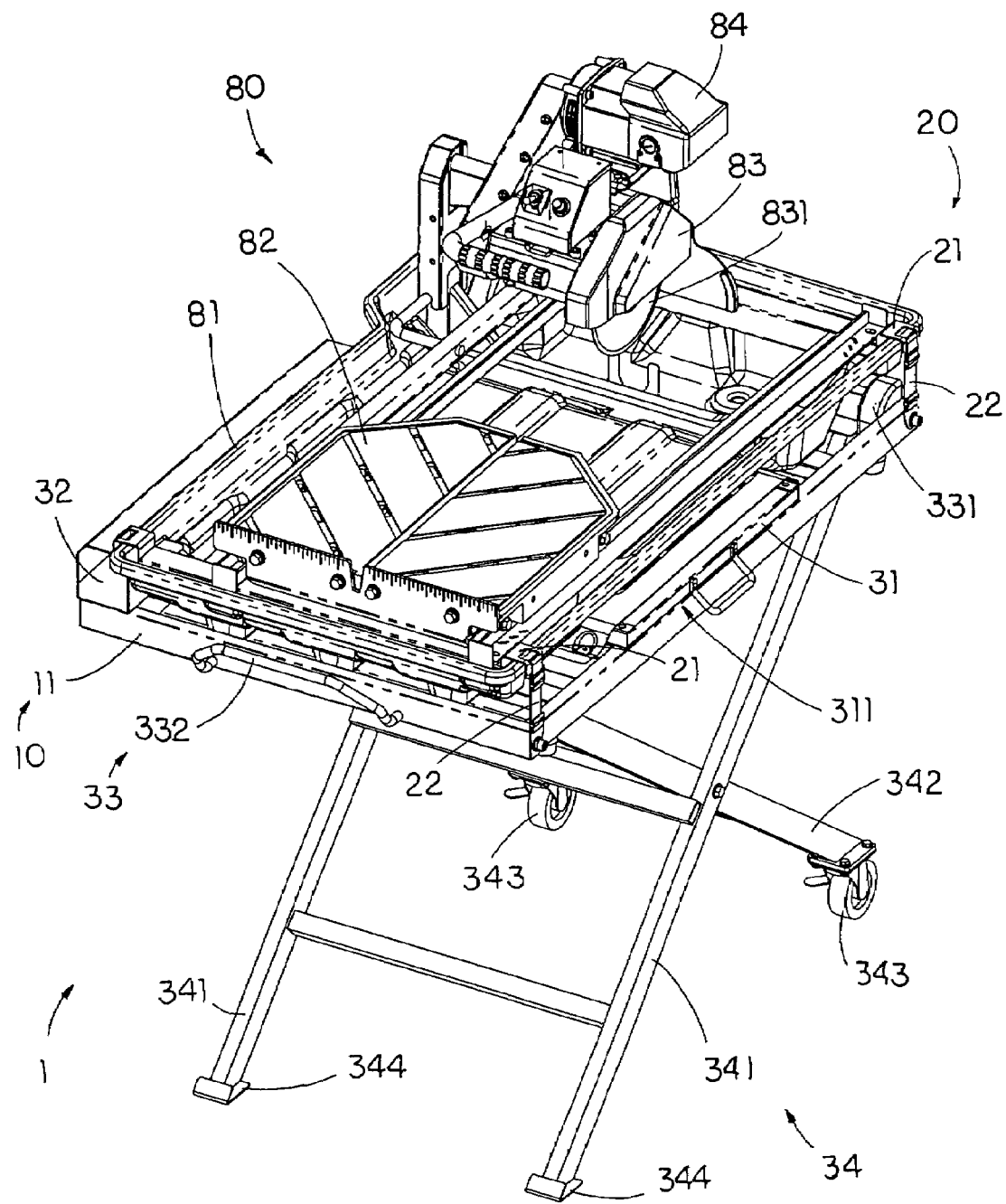
FIG. 1 is a perspective view of a docking frame incorporated with a cutting machine according to a preferred embodiment of the present invention.
Figure 2:
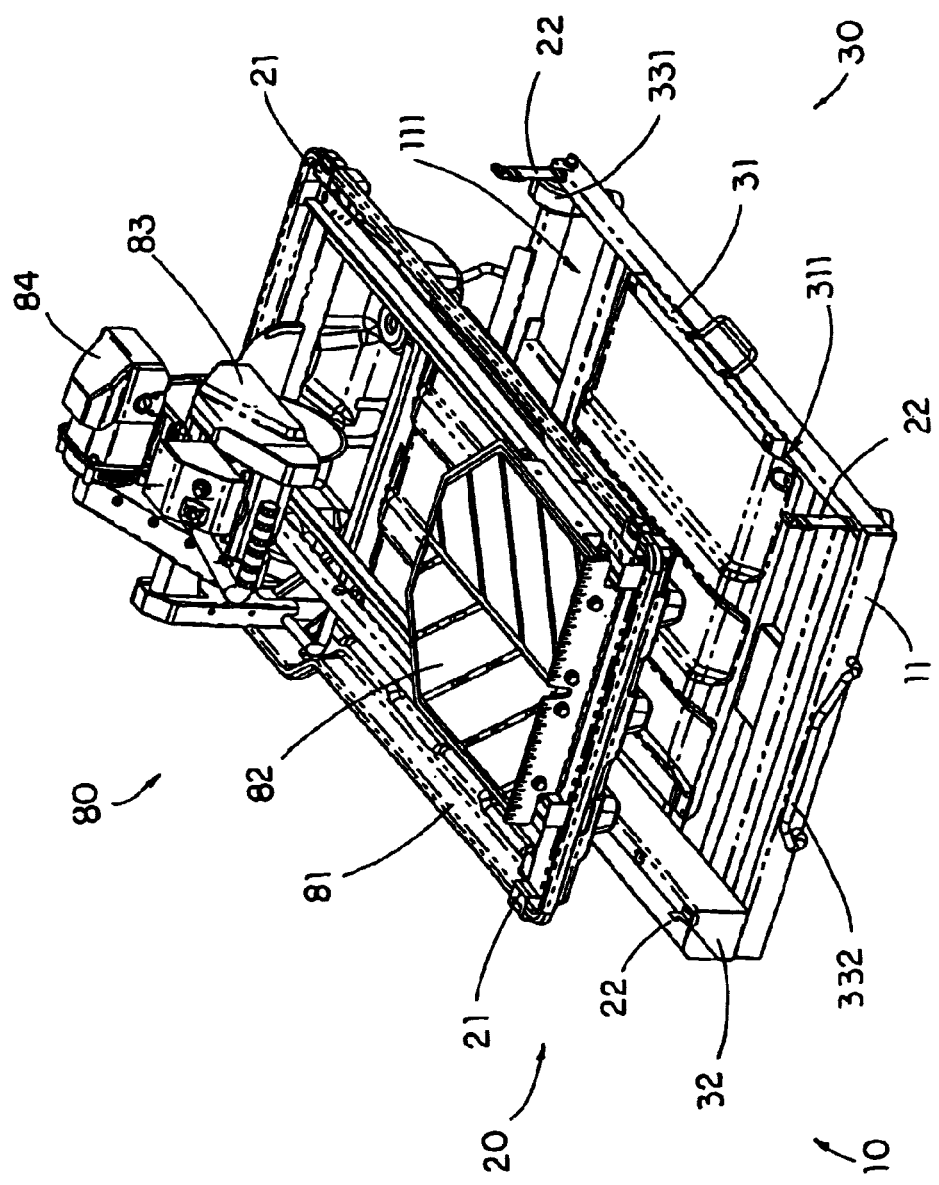
FIG. 2 is an exploded perspective view of a docking frame incorporated with the cutting machine according to the above preferred embodiment of the present invention.

Referring to FIGS. 1 and 2 of the drawings, a docking frame 1 for a cutting machine 80, such as a conventional power saw machine, according to a preferred embodiment of the present invention is illustrated, wherein the cutting machine 80 usually comprises a main frame 81 having four side edges 811, a cutting table 82 slidably supported on the main frame 81, a cutting head 83 having a cutting blade 831 overhangingly supported above the cutting table 82, and a power device 84 electrically connected to the cutting head 83 to drive the cutting blade 831 to rotate.

The power device 84 is typically embodied as a high-speed motor electrically connected to the cutting head 83 and an external power source, such as an AC power source, for accruing power to drive the cutting blade 831 to rotate. The cutting table 82 is typically for a work piece to rest thereon and is arranged to slidably move on the main frame 81 for moving the work piece to be cut by the cutting blade 831.

The docking frame 1 comprises a docking station 10 comprising a boundary frame 11 having a docking socket 111 for receiving a bottom portion of the main frame 81 of the cutting machine 80.

The docking frame 1 further comprises a locker device 20 provided at the boundary frame 111 for detachably locking the main frame 81 of the cutting machine 80 at the boundary frame 11, and a peripheral functional gear 30 provided at the docking station 10 as a supplemental implement for the cutting machine 80 to enhance the workability of the cutting machine 80.

According to the preferred embodiment, the docking socket 111 is defined within the boundary frame 11 and has a depth corresponding to a height of the bottom portion of the main frame 81 of the cutting machine 80, wherein the boundary frame 11 of the docking station 10 is sized and shaped for fittingly receiving the bottom portion of the main frame 81 of the cutting machine 80 within the docking socket 111.

The locker device 20 comprises a plurality of locking members 21 adapted for spacedly and outwardly extended from a peripheral side of the main frame 81, and a plurality of locker arms 22 spacedly extended formed the boundary frame 11 to detachably engage with the locking members 21 respectively for securely locking up the main frame 81 on the docking station 10 within the docking socket 111.

According to the preferred embodiment, the locking members 21 are respectively mounted at corner portions of the main frame 81 above the docking station 10 to respectively align with corner portions of the boundary frame 11.

Each of the locker arms 22 has a lower pivot end pivotally connected to the respective corner portion of the boundary frame 11 and an upper locker end detachably engaged with the respective locking member 21 so as to lock up the main frame 81 within the boundary frame 11.

It is worth to mention that a length of each of the locking arms 22 is slighter longer than a vertical distance between the locking member 21 and the respective side edge of the boundary frame 11 when the main frame 81 of the cutting machine 80 is substantially engaged with the docking socket 111 of the docking station 10 of the docking frame 10 so as to substantially engage the locker ends of the locker arms 22 with the locking members 21 respectively for securely retaining the cutting machine 80 in position above the docking frame 1.

Alternatively, the locking arm 22 can be embodied as a resilient arm extended from the boundary frame 11 to lock up the main frame 81 of the cutting machine 80 with the docking station 10. The resilient arm, having elastic ability, provides a pulling force against the main frame 81 such that when the resilient arm locks with the main frame 81, the cutting machine 80 is securely retained at the docking station 10 by the pulling force. Accordingly, the resilient arm is made of elastic rubber adapted to be stretched to mount on the main frame 81 of the cutting machine 80.

Figure 3:
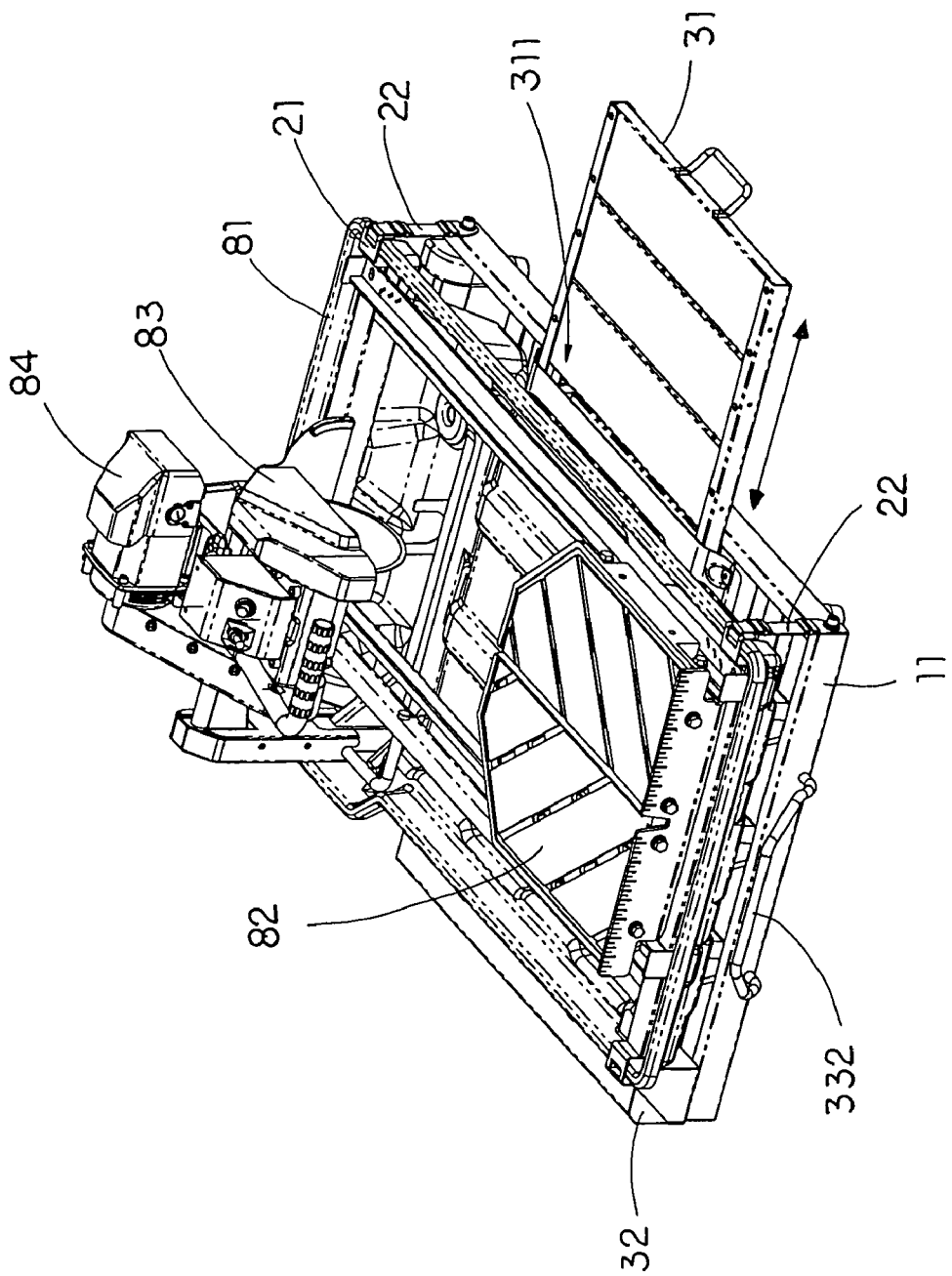
FIG. 3 is a perspective view a peripheral functional gear of the docking frame according to the above preferred embodiment of the present invention, illustrating a retractable utility table.

The peripheral functional gear 30 is provided at the docking station 10 as a supplemental implement for the cutting machine 80 so as to enhance the workability thereof. Referring to FIG. 3 of the drawings, the peripheral functional gear 30 comprises a retractable utility table 31 slidably mounted within the docking socket 111 at a position below the bottom portion of the main frame 81 of the cutting machine wherein the boundary frame 11 further has a side opening 311 communicating with the docking socket 111 such that the retractable utility table 31 is adapted to slidably fold between a storage position and a working position. In which, at the storage position, the retractable utility table 31 is slidably received within the docking station 111, and at the working position, the retractable utility table 31 is sidewardly slid out of the docking station 111 through the side opening 311 to form as a side working platform for the cutting machine 80. Accordingly, the retractable utility table 31 functions as an extra side working surface for the user to put the work pieces to be cut or after cut or accessories thereon for convenience.

It is worth pointing out that the retractable utility table 31 is therefore capable of being received in the docking station 10 when the user finishes working on the utility table 31, so that the docking frame 1 of the present invention is optimal for convenient storage after use. The retractable utility table 31 can be embodied as being made of rigid materials, such as plastic, composite or wood in order to provide a reasonable support to auxiliary work performed on the retractable utility table 31, and more importantly, to allow easy and convenient sliding of the retractable utility table 31 between the working position and the storage position.

Figure 4A:
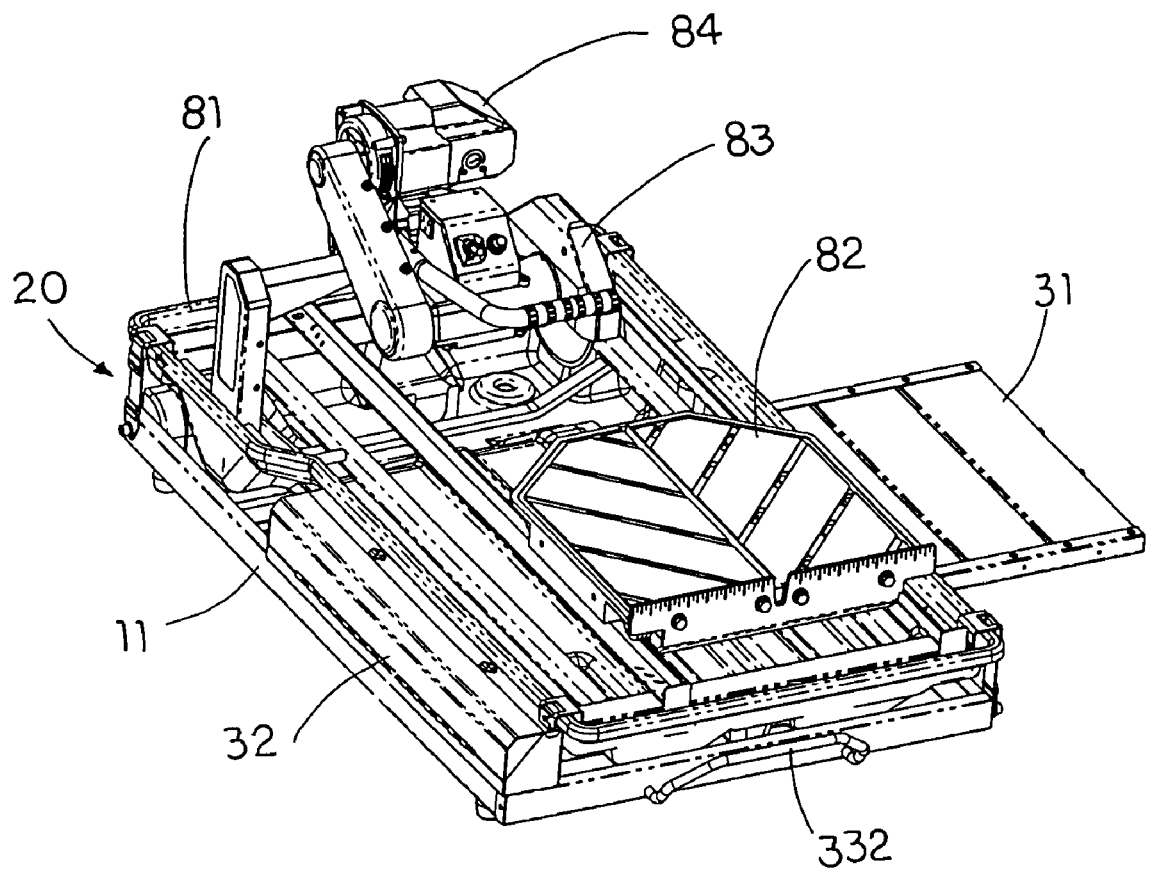
FIG. 4A and FIG. 4B are schematic diagrams for the peripheral functional gear according to the above preferred embodiment of the present invention, illustrating a utility tools box.
Figure 4B:
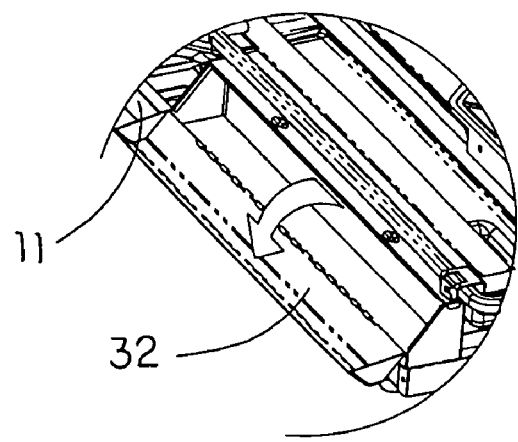

Referring to FIG. 4A and FIG. 4B of the drawings, the peripheral functional gear 30 further comprises a utility tools box 32 mounted on a side of the boundary frame 11 of the docking station 10 for containing utility tools of the cutting machine 80. Accordingly, the utility tools box 32 has a retrieval opening formed on a side surface of the utility tools box 32 such that a user of the present invention can assess to the utility tools box 32 via the retrieval opening. It is important to point out that utility tools are held in the utility tools box 32 so that during the course of operation of the cutting machine 80, the user can be able to conveniently and easily retrieve the particular utility tools for auxiliary use for the machining process.

Moreover, since the utility tools box 32 is supported by the docking frame 1 at an elevated height above the ground, the user does not need to go somewhere else to get the required tools. They are readily available for use.

Figure 5:
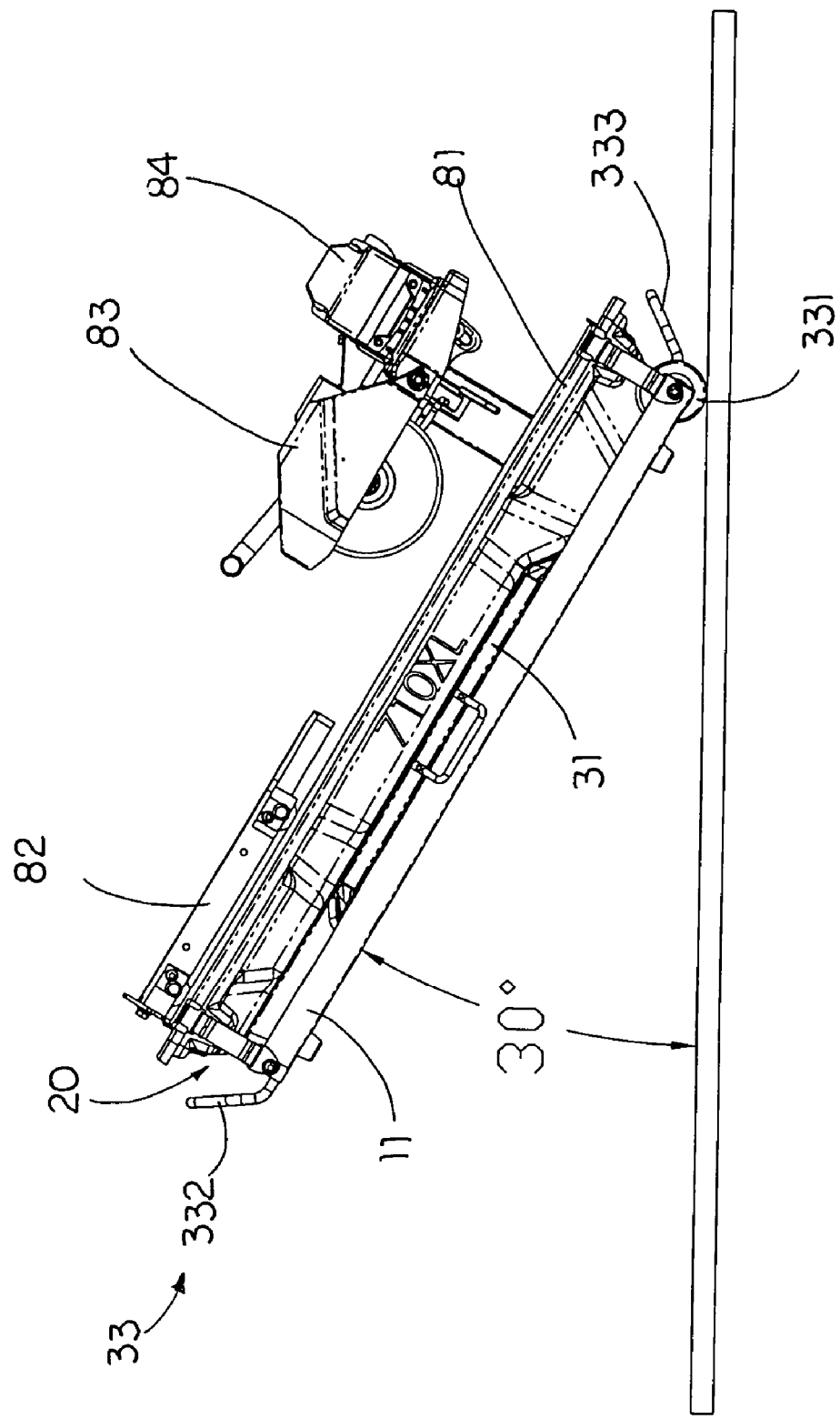
FIG. 5 is a schematic diagram for the peripheral functional gear according to the above preferred embodiment of the present invention, illustrating a dolly frame.

Referring to FIGS. 1 and 5 of the drawings, the peripheral functional gear 30 further comprises a dolly frame 33 provided on the docking station 10 for facilitating easy and convenient transportation of the cutting machine 80 incorporating with the docking frame 1. According to the preferred embodiment, the dolly frame 33 comprises two wheel assemblies 331 rotatably and spacedly mounted at a bottom portion of the boundary frame 11 at a rear side thereof and a dolly handle 332 frontwardly extended from the boundary frame 11 in such a manner that the docking station 10 is pivotally lifted up via the dolly handle 332 for carrying the cutting machine 80 on the docking frame 1 via the wheel assemblies 331.

As shown in FIG. 5, the cutting head 83 and the power device 84 of the cutting machine 80 is supported at the rear portion of the docking frame 1 such that the downward force of the weight of the cutting machine 80 is mainly applied at the rear portion of the docking frame 1. Accordingly, the two wheel assemblies 331 are rotatably mounted at the rear side of the docking station 10 at a position below the cutting head 83 and the dolly handle 332 is mounted at the front side of the docking station 10 at a position below the cutting table 82 such that the user is able to easily lift up the front side of the docking station 10 via the dolly handle 332 to transport the cutting machine 80 as operating the conventional dolly.

In order to further enhance the stability of the docking frame 1, the dolly frame 33 further comprises means 333 for locking the wheel assemblies 331 in a rotatably movable manner so as to retain each of the wheel assemblies 331 in position. In other words, the wheel locking means 333, when activated, can prevent unwanted movement of the docking frame 1 so as to maintain stability thereof.

The docking frame 1 further comprises a foldable leg frame 34 detachably connected to the docking station 10 to form the docking station 10 as a table frame, wherein the foldable leg frame 34 comprises two pairs of frame legs each having a first standing leg 341 and a second standing leg 342 pivotally connected with each other in a cross manner to form a pivotal 'X' structure, wherein four upper ends of the first and second standing legs 341, 342 are detachably attached to a bottom side of the docking station 10 so as to form the table frame for supporting the cutting machine 80 thereon.

According to the preferred embodiment, the foldable leg frame 34 is adapted to be folded into a compact unit when the first and second standing legs 341, 342 are pivotally folded to each other. Therefore, the user is able to easily set up the docking frame 1 as the table frame by attaching the unfolded first and second standing legs 341, 342 of the foldable leg frame 34 to the bottom side of the docking station 10 such that the cutting machine 80 is securely supported on the table frame for operation.

As shown in FIG. 1, the foldable leg frame 34 further comprises two table wheels 343 rotatably mounted at two bottom ends of the second standing legs 342 respectively and two ground stabilizers 344 affixed to two bottom ends of the first standing legs 341 respectively, so as to enhance the mobility of the table frame. Accordingly, the two table wheels 343 are embodied as two lockable wheels 343 adapted to be locked to be rotated. Therefore, when the user needs to move the cutting machine 80 on the table frame in a short distance, he or she is able to unlock the table wheels 343 and to move both the cutting machine 80 and the table frame together without detaching the foldable leg frame 34 from the docking station 10. Once the cutting machine 80 is moved to a desired location, the user is able to lock up the table wheels 343 such that the cutting machine 80 is rigidly supported on the table frame in a stable manner.

It is worth to mention that if the user needs to transport the cutting machine 80 for a long distance, it is preferred that the cutting machine 80 should be transported by the dolly frame 33. In other words, after using the cutting machine 80, the user is able to detach the foldable leg frame 34 and fold the foldable leg frame 34 into the compact unit. Then, the user is able to lift up the docking frame 1 together with the cutting machine 80 at an inclined angle with the ground by grapping the dolly handle 332. Finally, after unlocking the wheel assemblies 331, the user is able to transport the docking frame 1 and the cutting machine 80 via the wheels assemblies 331 by pulling the dolly handle 332, as shown in FIG. 5 of the drawings.

Therefore, the docking frame 1 provides a plurality of supplement tools, i.e. the retractable utility table 31, the utility tools box 32, the dolly frame 33, and the foldable leg frame 34, for the cutting machine 80 during the use thereof. From the forgoing description, it can be shown that the docking frame 1 of the present invention substantially achieves the several objects of the present invention. It is worth to mention that the docking frame 1 can be built-in with the cutting machine 80, wherein the main frame 81 is rigidly mounted to the boundary frame 11 of the docking station 10 that the bottom portion of the main frame 81 is received within the station socket 111 such that the locker device 20 is omitted while the docking frame 1 provides the peripheral functional gear 30 as a supplemental implement for the cutting machine 80 to enhance the workability of the cutting machine 80.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A docking frame for a cutting machine which comprises a cutting head and a main frame having four side edges, wherein said docking frame comprises:

a docking station comprising a boundary frame defining a docking socket therewithin, wherein said docking socket has a depth corresponding to a height of a bottom portion of said cutting machine for fittingly receiving said bottom portion of said cutting machine within said docking socket at a position that said four side edges of said main frame is supported on said boundary frame so as to support said cutting head of said cutting machine above said docking station;

a locker device comprising a plurality of locking members adapted for spacedly and outwardly extended from said side edges of said main frame of said cutting machine, and a plurality of locker arms spacedly extended from said boundary frame to detachably engage with said locking members respectively for detachably locking said bottom portion of said cutting machine at said boundary frame within said docking socket; and a peripheral functional gear provided at said docking station as a supplemental implement for said cutting machine so as to enhance a workability of the cutting machine, wherein said peripheral functional gear comprises:

a retractable utility table slidably mounted within said docking socket at a position below said bottom portion of said cutting machine, wherein said boundary frame further has a side opening communicating with said docking socket such that said retractable utility table is slidably folded between a storage position and a working position, wherein at said storage position, said retractable utility table is slidably received within said docking station, and at said working position, said retractable utility table is sidewardly slid out of said docking station through said side opening to form as a side working platform for said cutting machine;

a utility tools box mounted on a side of said boundary frame of said docking station for containing utility tools of said cutting machine; and a dolly frame comprising two wheel assemblies rotatably and spacedly mounted at a bottom portion of said boundary frame at a rear side thereof and a dolly handle frontwardly extended from said boundary frame in such a manner that said docking station is pivotally lifted up via said dolly handle for carrying said cutting machine on said docking frame via said wheel assemblies.

2. The docking frame, as recited in claim 1, wherein each of said locker arms has a lower pivot end pivotally connected to said boundary frame and an upper locker end detachably engaged with said respective locking member for locking up said cutting machine with said docking station.

3. The docking frame, as recited in claim 1, wherein each of said locker arms comprises a resilient arm extended from said boundary frame to detachably engage with said locking member for providing a pulling force against said cutting machine so as to lock up said cutting machine with said docking station.

4. A cutting assembly, comprising:
a cutting machine which comprises a main frame having four side edges, a cutting table slidably supported on said main frame, a cutting head having a cutting blade overhangingly supported above said cutting table, and a power device electrically connected to said cutting head to drive said cutting blade to rotate, and
a docking frame, which comprises:
a docking station comprising a boundary frame defining a docking socket therewithin, wherein said docking socket, having a depth corresponding to a height of a bottom portion of said cutting machine, fittingly receiving said bottom portion of said cutting machine within said docking socket at a position that said four side edges of said main frame is supported on said boundary frame so as to support said cutting head of said cutting machine above said docking station;

a locker device comprising a plurality of locking members spacedly and outwardly extended from said side edges of said main frame of said cutting machine, and a plurality of locker arms which are spacedly extended from said boundary frame and are detachably engaged with said locking members respectively to detachably lock said bottom portion of said cutting machine at said boundary frame within said docking socket; and a peripheral functional gear provided at said docking station as a supplemental implement for said cutting machine so as to enhance a workability of the cutting machine, wherein said peripheral functional gear comprises:

a retractable utility table slidably mounted within said docking socket at a position below said bottom portion of said cutting machine, wherein said boundary frame further has a side opening communicating with said docking socket such that said retractable utility table is slidably folded between a storage position and a working position, wherein at said storage position, said retractable utility table is slidably received within said docking station, and at said working position, said retractable utility table is sidewardly slid out of said docking station through said side opening to form as a side working platform for said cutting machine;

a utility tools box mounted on a side of said boundary frame of said docking station for containing utility tools of said cutting machine; and a dolly frame comprising two wheel assemblies rotatably and spacedly mounted at a bottom portion of said boundary frame at a rear side thereof and a dolly handle frontwardly extended from said boundary frame in such a manner that said docking station is pivotally lifted up via said dolly handle for carrying said cutting machine on said docking frame via said wheel assemblies.

5. The cutting assembly, as recited in claim 4, wherein each of said locker arms has a lower pivot end pivotally connected to said boundary frame and an upper locker end detachably engaged with said respective locking member for locking up said cutting machine with said docking station.

6. The cutting assembly, as recited in claim 4, wherein each of said locker arms comprises a resilient arm extended from said boundary frame to detachably engage with said locking member for providing a pulling force against said cutting machine so as to lock up said cutting machine with said docking station.

* * * * *